US009946346B2

(12) United States Patent
Kawamura et al.

(10) Patent No.: US 9,946,346 B2
(45) Date of Patent: Apr. 17, 2018

(54) NOTIFICATION CONTROL APPARATUS FOR IDENTIFYING PREDETERMINED FRAME IN MOVING IMAGE

(71) Applicant: CASIO COMPUTER CO., LTD., Shibuya-ku, Tokyo (JP)

(72) Inventors: Yoshihiro Kawamura, Tokyo (JP); Kouichi Nakagome, Saitama (JP); Tomohiko Murakami, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 209 days.

(21) Appl. No.: 14/219,998

(22) Filed: Mar. 19, 2014

(65) Prior Publication Data
US 2014/0289628 A1    Sep. 25, 2014

(30) Foreign Application Priority Data

Mar. 21, 2013  (JP) ................................ 2013-058760

(51) Int. Cl.
*G06F 3/0485* (2013.01)
*G06F 3/01* (2006.01)

(52) U.S. Cl.
CPC .......... *G06F 3/016* (2013.01); *G06F 3/04855* (2013.01); *G06F 2203/014* (2013.01)

(58) Field of Classification Search
CPC .......................... G06F 3/0484; G06F 3/04855
USPC ........................................................ 715/720
See application file for complete search history.

(56) References Cited

U.S. PATENT DOCUMENTS

| 6,001,014 A * | 12/1999 | Ogata .................. A63F 13/02 463/37 |
| 8,559,683 B2 * | 10/2013 | Wada ................ G06F 17/30781 348/564 |
| 8,641,524 B2 * | 2/2014 | Nakajima ............... A63F 13/00 345/174 |
| 8,837,919 B2 | 9/2014 | Isozu et al. |
| 8,966,372 B2 * | 2/2015 | Lin ...................... G11B 27/034 707/802 |
| 9,110,562 B1 * | 8/2015 | Eldawy ............ H04N 21/47217 |

(Continued)

FOREIGN PATENT DOCUMENTS

| CN | 203324637 U | 12/2013 |
| JP | 2008072515 A | 3/2008 |

(Continued)

OTHER PUBLICATIONS

Scott, Jeremy, "Cool Keyboard Shortcuts to Scrub Through Youtube Videos", available at <http://www.reelseo.com/youtube-shortcuts-scrubbing/>, available on Oct. 26, 2010, 2 pages.*

(Continued)

*Primary Examiner* — Reza Nabi
*Assistant Examiner* — Daniel Rodriguez
(74) *Attorney, Agent, or Firm* — Holtz, Holtz & Volek PC

(57) ABSTRACT

A notification control apparatus is provided with a moving image acquisition unit 41 that acquires a moving image, an identification unit 44 that identifies a frame according to forwarding operation, out of a plurality of frames constituting the moving image, a determination unit 46 that determines whether or not the identified frame is a predetermined frame, and a notification control unit 49 that notifies determination result by the determination unit 46.

13 Claims, 8 Drawing Sheets

(56) References Cited

U.S. PATENT DOCUMENTS

| | | | | |
|---|---|---|---|---|
| 9,211,439 | B1* | 12/2015 | Pedenko | A63B 24/0006 |
| 9,696,807 | B2* | 7/2017 | Fleizach | G06F 3/016 |
| 2001/0016518 | A1* | 8/2001 | Nishiumi | A63F 13/06 |
| | | | | 463/36 |
| 2002/0114493 | A1* | 8/2002 | McNitt | A61B 5/1124 |
| | | | | 382/107 |
| 2002/0115046 | A1* | 8/2002 | McNitt | A63B 24/0003 |
| | | | | 434/252 |
| 2002/0115047 | A1* | 8/2002 | McNitt | A63B 24/0003 |
| | | | | 434/252 |
| 2002/0180774 | A1* | 12/2002 | Errico | G11B 27/005 |
| | | | | 715/721 |
| 2002/0184220 | A1* | 12/2002 | Teraguchi | G06F 17/30843 |
| 2003/0063130 | A1* | 4/2003 | Barbieri | G11B 27/105 |
| | | | | 715/833 |
| 2003/0093790 | A1* | 5/2003 | Logan | G06F 17/30265 |
| | | | | 725/38 |
| 2005/0198570 | A1* | 9/2005 | Otsuka | G06F 17/30787 |
| | | | | 715/201 |
| 2005/0265690 | A1* | 12/2005 | Kawasaki | H04N 7/17309 |
| | | | | 386/201 |
| 2006/0003300 | A1* | 1/2006 | Davis | A63B 24/0003 |
| | | | | 434/247 |
| 2006/0268363 | A1* | 11/2006 | Meinders | G06F 3/1423 |
| | | | | 358/453 |
| 2009/0325645 | A1* | 12/2009 | Bang | G06F 3/016 |
| | | | | 455/566 |
| 2011/0161820 | A1* | 6/2011 | Lee | G06F 17/30038 |
| | | | | 715/723 |
| 2011/0207100 | A1* | 8/2011 | Brokken | G06F 3/011 |
| | | | | 434/236 |
| 2012/0050529 | A1* | 3/2012 | Bentley | G01S 19/19 |
| | | | | 348/139 |
| 2012/0092146 | A1* | 4/2012 | Ryu | G09B 21/003 |
| | | | | 340/407.1 |
| 2013/0227410 | A1* | 8/2013 | Sridhara | H04N 21/235 |
| | | | | 715/702 |
| 2014/0043340 | A1* | 2/2014 | Sobhy | G06T 15/10 |
| | | | | 345/473 |
| 2014/0059418 | A1* | 2/2014 | Yu | G06F 17/241 |
| | | | | 715/230 |
| 2014/0114643 | A1* | 4/2014 | Baker | G06F 17/30817 |
| | | | | 704/9 |
| 2014/0132547 | A1* | 5/2014 | Adachi | G11B 19/025 |
| | | | | 345/173 |
| 2014/0168124 | A1* | 6/2014 | Park | G06F 3/016 |
| | | | | 345/173 |
| 2014/0178034 | A1* | 6/2014 | Kim | H04N 5/765 |
| | | | | 386/230 |
| 2014/0266644 | A1* | 9/2014 | Heubel | G06F 3/0421 |
| | | | | 340/407.1 |
| 2014/0267904 | A1* | 9/2014 | Saboune | G08B 6/00 |
| | | | | 348/460 |
| 2014/0344698 | A1* | 11/2014 | Hohteri | G06F 3/0488 |
| | | | | 715/720 |
| 2015/0227196 | A1* | 8/2015 | Fujii | G06F 3/011 |
| | | | | 345/156 |

FOREIGN PATENT DOCUMENTS

| | | |
|---|---|---|
| JP | 2009224818 A | 10/2009 |
| JP | 2009301638 A | 12/2009 |
| JP | 2012-032932 A | 2/2012 |
| JP | 2012123866 A | 6/2012 |
| KR | 1020030085306 A | 11/2003 |

OTHER PUBLICATIONS

Korean Office Action dated Jan. 12, 2015, issued in counterpart Korean Application No. 10-2014-0029280.

Japanese Office Action dated Feb. 17, 2015, issued in counterpart Japanese Application No. 2013-058760.

Japanese Office Action (and English translation thereof) dated Oct. 11, 2016, issued in counterpart Japanese Application No. 2015-223858.

Chinese Office Action (and English translation thereof) dated Oct. 9, 2016, issued in counterpart Chinese Application No. 201510535259.0.

* cited by examiner

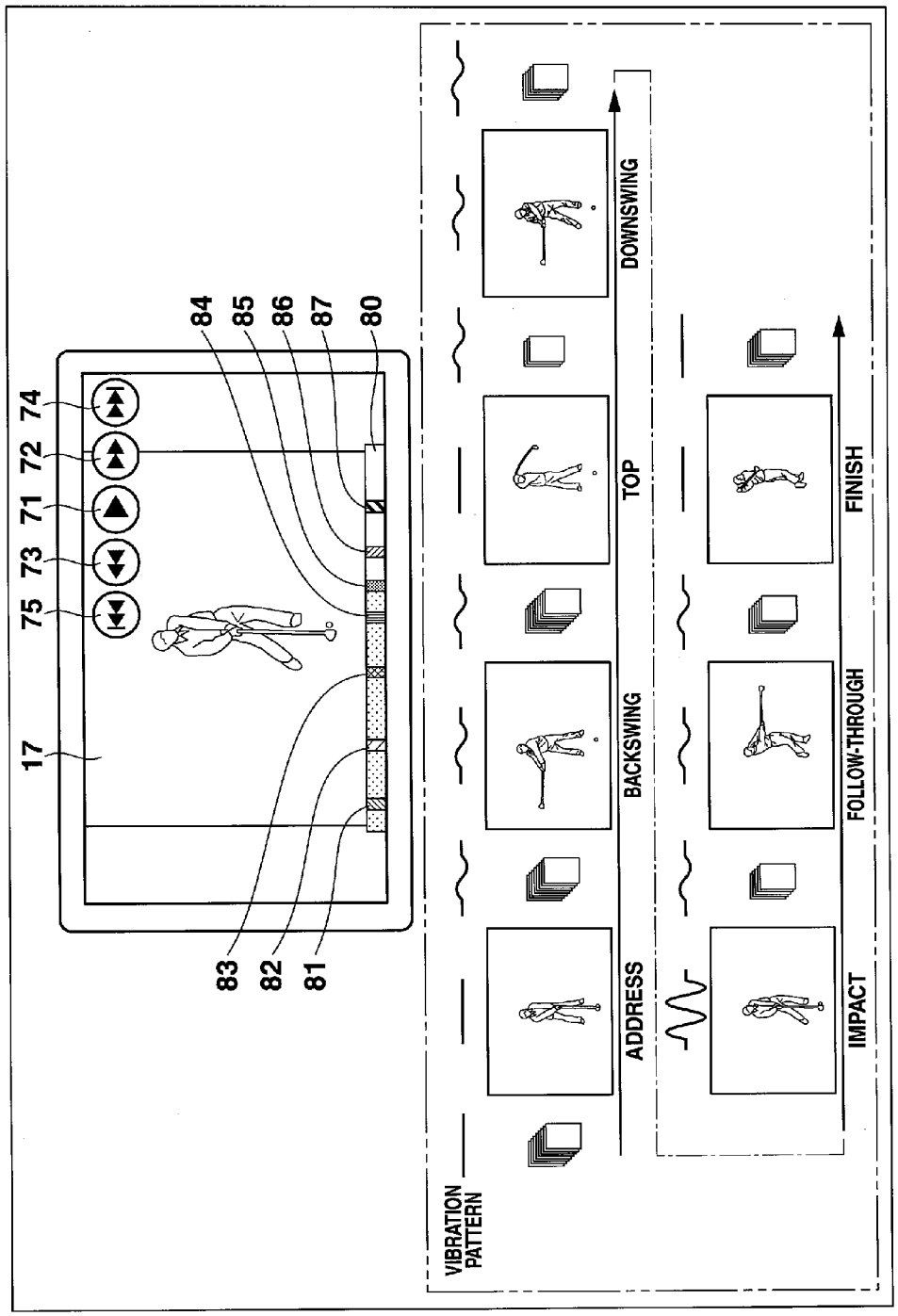

NOTIFICATION CONTROL APPARATUS FOR IDENTIFYING PREDETERMINED FRAME IN MOVING IMAGE

This application is based upon and claims the benefit of priority from the prior Japanese Patent Application No. 2013-058760, filed Mar. 21, 2013, and the entire contents of which are incorporated herein by reference.

BACKGROUND OF THE INVENTION

Field of the Invention

The present invention relates to a notification control apparatus, a notification control method, and a storage medium for identifying a predetermined frame in a moving image.

Related Art

Conventionally, Japanese Unexamined Patent Application Publication No. 2012-32932 discloses a moving image reproduction technique in which a predetermined frame is displayed by fast-forwarding operation and rewinding operation of frames (hereinafter referred to as "skipping operation") by a user.

SUMMARY OF THE INVENTION

An apparatus according to a first aspect of the present application is an notification control apparatus including: n acquisition unit that acquires a moving image; an identification unit that identifies a frame according to skipping operation, out of a plurality of frames constituting the moving image acquired by the acquisition unit; a determination unit that determines whether or not the frame identified by the identification unit is a predetermined frame; and a notification control unit that notifies determination result by the determination unit.

A method according to a second aspect of the present application is notification control method executed by a notification control apparatus, the method including: an acquisition step that acquires a moving image; an identification step that identifies a frame according to skipping operation, out of a plurality of frames constituting the moving image acquired by the acquisition step; a determination step that determines whether or not the frame identified by the identification step is a predetermined frame; and a notification control step that notifies determination result by the determination step.

A non-transitory storage medium according to a third aspect of the present application is a non-transitory storage medium storing a computer-readable program that allows a computer to perform functions as units including: an acquisition unit that acquires a moving image; an identification unit that identifies a frame according to skipping operation, out of a plurality of frames constituting the moving image acquired by the acquisition unit; a determination unit that determines whether or not the frame identified by the identification unit is a predetermined frame; and a notification control unit that notifies determination result by the determination unit.

BRIEF DESCRIPTION OF THE DRAWINGS

FIG. 8 is a view indicative of vibration patterns as notification information according to a modification example.

DETAILED DESCRIPTION OF THE INVENTION

Hereinafter, an embodiment of the present invention will be explained with reference to the drawings.

[Configuration]

Figure 1:
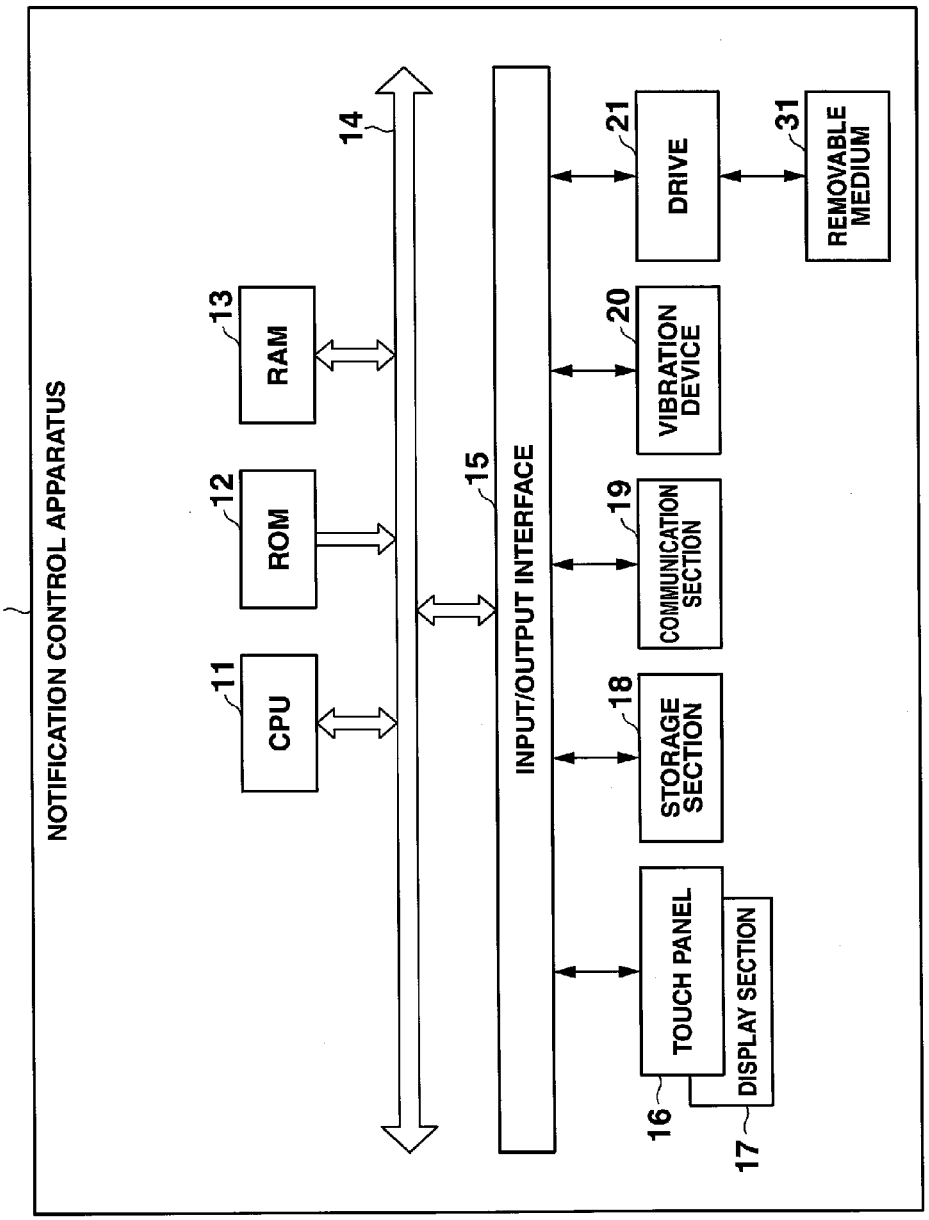
FIG. 1 is a block diagram indicative of hardware configuration of a notification control apparatus according to an embodiment of the present invention.

FIG. 1 is a block diagram indicative of hardware configuration of a notification control apparatus according to the embodiment of the present invention.

A notification control apparatus 1 is provided with a CPU (Central Processing Unit) 11, a ROM (Read Only Memory) 12, a RAM (Random Access Memory) 13, a bus 14, an input/output interface 15, a touch panel 16, a display section 17, a storage section 18, a communication section 19, a vibration device 20, and a drive 21.

The CPU 11 executes various kinds of processing according to a program stored in the ROM 12, or a program loaded from the storage section 18 into the RAM 13.

The RAM 13 stores data and the like that are required when the CPU 11 executes the various kinds of the processing, as appropriate.

The CPU 11, the ROM 12, and the RAM 13 are connected to each other via the bus 14. The input/output interface 15 is also connected to the bus 14. The touch panel 16, the display section 17, the storage section 18, the communication section 19, the vibration device 20, and the drive 21 are connected to the input/output interface 15.

The touch panel 16 is formed as a capacitance type touch panel or a resistance film type touch panel that is laminated on a display screen of the display section 17, and detects coordinates of the position where touch operation is made. Here, the touch operation means contact operation or approach operation of an object (the fingers of a user, a touch pen and the like) to the touch panel 16.

The display section 17 is formed by a display, and displays images.

The storage section 18 is formed by a hard disk, DRAM (Dynamic Random Access Memory) or the like, and stores data of the various images.

The communication section 19 controls communication with other apparatuses (not illustrated) via a network including the Internet.

The vibration device 20 vibrates a housing or the like of the notification control apparatus 1, on the basis of a control signal received from the CPU 11.

A removable medium 31 that is formed by a magnetic disk, an optical disk, a magneto-optical disk, semiconductor memory, or the like is mounted, as appropriate, on the drive 21. A program that is read out from the removable medium 31 by the drive 21 is installed onto the storage section 18 as required. In addition, the removable medium 31 can store the various kinds of data, such as the image data, that are stored in the storage section 18, similarly to the storage section 18.

Figure 2:
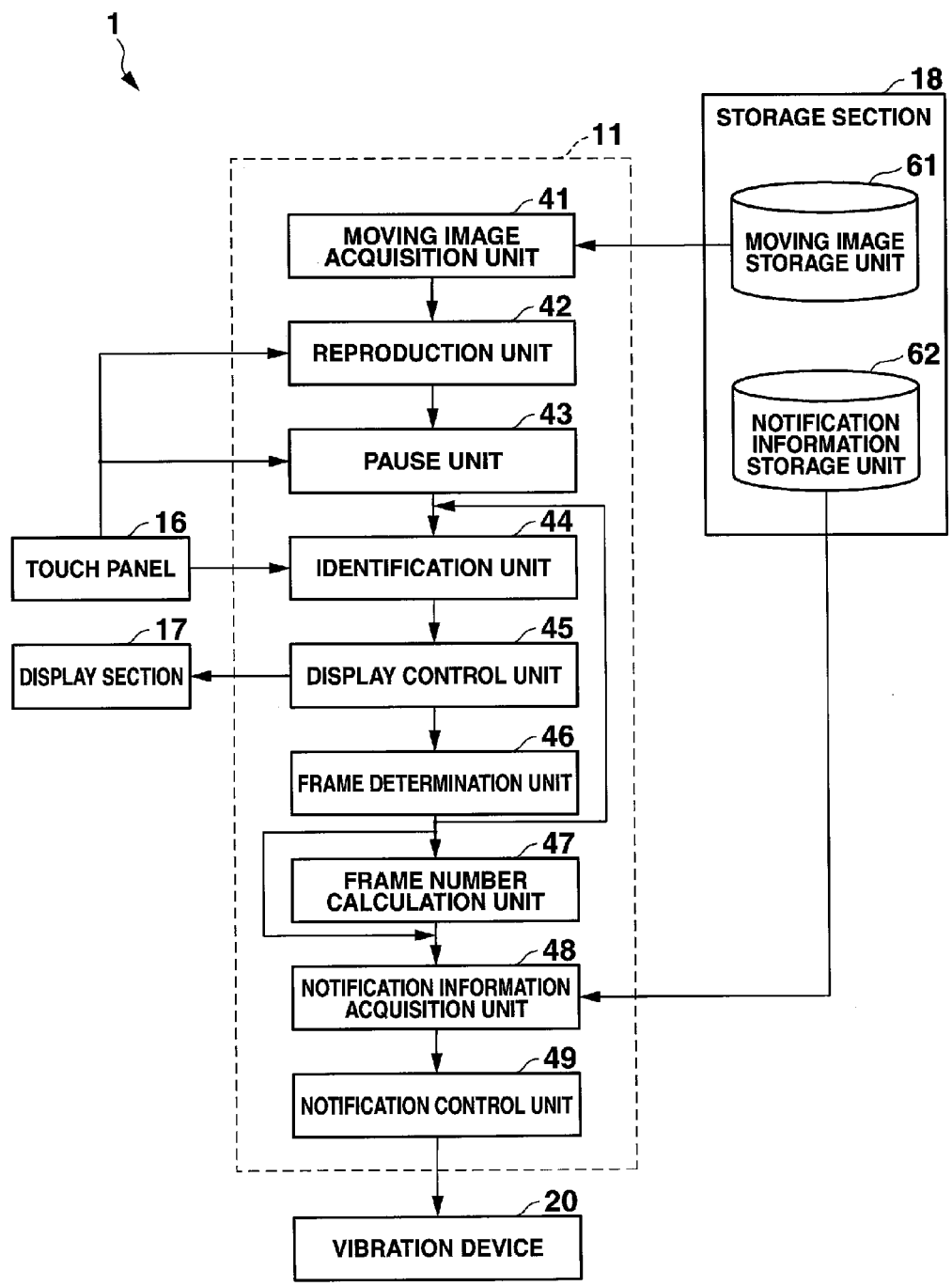
FIG. 2 is a functional block diagram indicative of functional configuration for executing notification control processing, in the functional configuration of the notification control apparatus of FIG. 1.

FIG. 2 is a functional block diagram indicative of functional configuration for executing notification control processing, in the functional configuration of the notification control apparatus 1 as described above.

The notification control processing is processing notifying that, when a frame in a moving image identified by user's skipping operation is a predetermined frame corresponding to one of identified postures of a subject's motion, the predetermined frame is identified.

Figure 3:
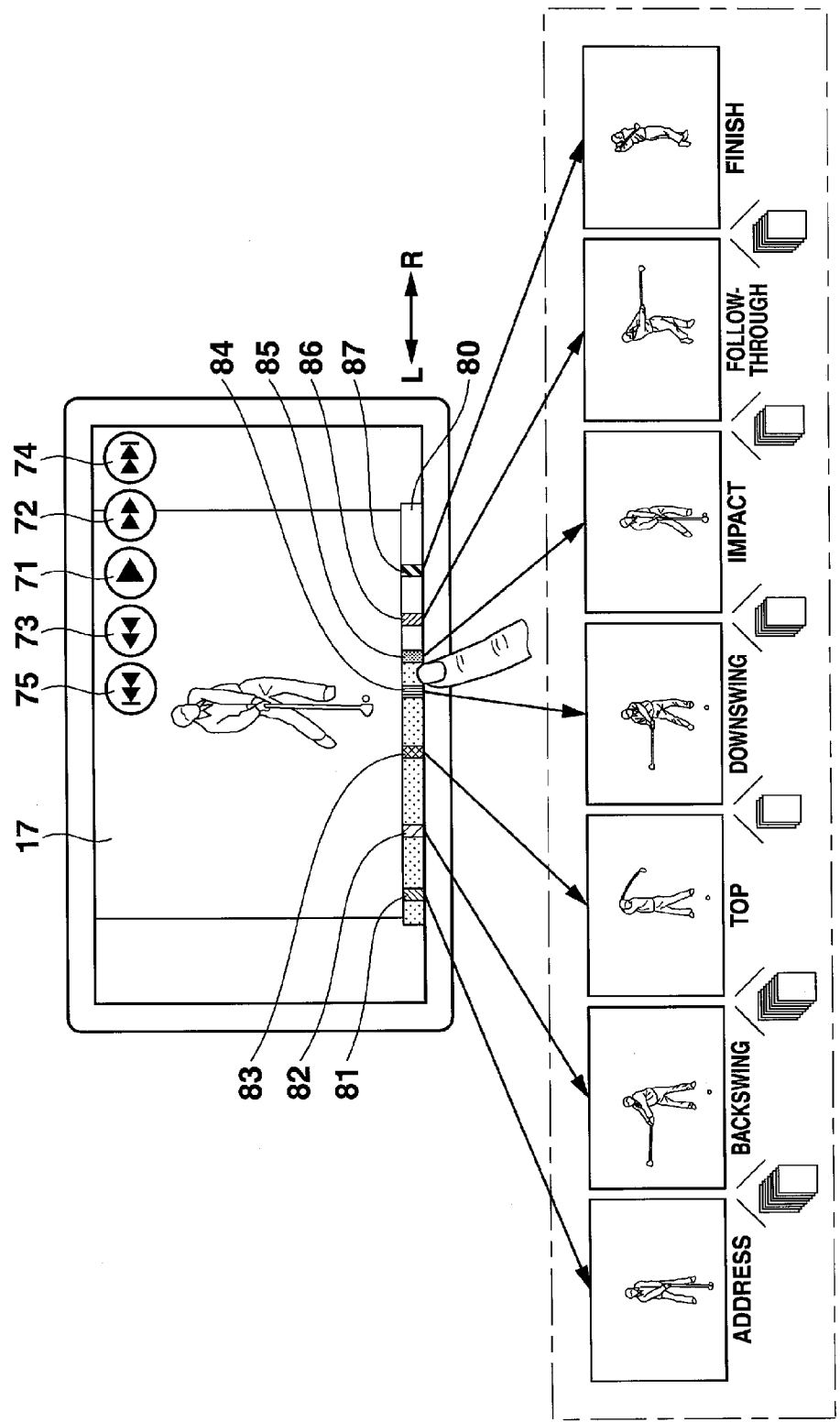
FIG. 3 is a view indicative of correspondence between operation of a display section and identified frames.

According to this embodiment, the identified postures of the subject's motion include seven types of postures of an "address" posture, a "backswing" posture, a "top" posture, a "downswing" posture, an "impact" posture, a "follow-through" posture, and a "finish" posture as indicated in FIG. 3, in postures of a golf swing. The frames corresponding to the predetermined postures are the predetermined frames of this embodiment.

In executing the notification control processing, a moving image acquisition unit 41, a reproduction unit 42, a pause unit 43, an identification unit 44, a display control unit 45, a frame determination unit 46, a frame number calculation unit 47, a notification information acquisition unit 48, and a notification control unit 49 function in the CPU 11, as indicated in FIG. 2.

It should be noted that FIG. 2 is merely an example, and at least a part of the functions of the CPU 11 may be transferred to hardware, such as a GA (Graphics Accelerator), that is provided for executing image processing.

In executing the notification control processing, a moving image storage unit 61 and a notification information storage unit 62 that are provided as an area in the storage section 18 are used.

The moving image storage unit 61 stores data of a moving image (a plurality of frames) that is image-captured in advance. According to this embodiment, the contents of the moving image are a series of golf swing movements of a golf player.

The notification information storage unit 62 stores notification information in advance corresponding to the respective predetermined frames that will be described later.

The moving image acquisition unit 41 reads out the moving image data stored in the moving image storage unit 61. Namely, the moving image acquisition unit 41 decodes the moving image data stored in the moving image storage unit 61 sequentially in a frame unit, and stores the decoded data of a series of the frames in the RAM 13.

The reproduction unit 42 executes reproduction of the moving image data acquired by the moving image acquisition unit 41. For example, the reproduction is executed when touch operation of a reproduction button 71 in FIG. 3 is made.

The pause unit 43 executes pause processing of the reproduction of the moving image data that is executed by the reproduction unit 42. For example, the pause processing is executed when the touch operation of the reproduction button 71 in FIG. 3 is made while the reproduction is executed.

The identification unit 44 identifies the frame in the moving image according to the skipping operation by the user while the reproduction of the moving image data is paused by the pause unit 43. Incidentally, there are a plurality of the frames in the moving image, and the respective frames correspond to the series of the golf swing movements of the subject. Therefore, the identification unit 44 identifies the frame corresponding to one of the series of the movements, according to the skipping operation by the user.

The skipping operation is executed when the touch operation of a fast-forwarding button 72 or a rewinding button 73 in FIG. 3 is made continuously. In addition, the skipping operation is also executed when the touch operation of a skip button 74 or 75 is made. It should be noted that, when the touch operation of the skip button 74 is made, the frame is skipped to the frame succeeding by a predetermined number. Meanwhile, when the touch operation of the skip button 75 is made, the frame is skipped to the frame preceding by a predetermined number.

Incidentally, according to this embodiment, the reproduction button 71, the fast-forwarding button 72, the rewinding button 73, and the skip buttons 74 and 75 are collectively referred to as a "moving image controller".

Incidentally, the skipping operation is also executed when the touch operation of a progress bar 80 in FIG. 3 is made. When the touch operation of the progress bar 80 is along the right direction (R direction in FIG. 3), the fast-forwarding operation is executed. Meanwhile, when the touch operation of the progress bar 80 is along the left direction (L direction in FIG. 3), the rewinding operation is executed. Moreover, when the touch operation is made on a freely-selected position of the progress bar 80, the frame is skipped to the frame corresponding to the position. For example, when the touch operation is made on a point 81 of the progress bar 80, the frame is skipped to the predetermined frame corresponding to the "address" posture. Similarly, the frame is skipped to the predetermined frame corresponding to the "backswing" posture at the time of a point 82, the predetermined frame corresponding to the "top" posture at the time of a point 83, the predetermined frame corresponding to the "downswing" posture at the time of a point 84, the predetermined frame corresponding to the "impact" posture at the time of a point 85, the predetermined frame corresponding to the "follow-through" posture at the time of a point 86, and the predetermined frame corresponding to the "finish" posture at the time of a point 87.

Incidentally, each of the predetermined frames is formed by one or more frames, and the number of the frames corresponds to a predetermined period that is decided for each of the identified postures. For example, when the speed of the swing at the time of the "impact" is faster, the number of the frames in the period decided for the "impact" posture is reduced.

It should be noted that, according to this embodiment, the points 81 to 86 are used in order to facilitate the explanation, and are not displayed on the display section 17.

Although the touch operation of both of the moving image controller and the progress bar 80 is available according to this embodiment, the touch operation of either one of these may be made available.

Back in FIG. 2, the display control unit 45 causes the display section 17 to display the data of the frame identified by the identification unit 44. In other words, the display control unit 45 causes the display section 17 to display the data of the frame identified according to the skipping operation by the user. Thus, the data of the frame identified according to the skipping operation by the user, while the moving image is paused, is displayed on the display section 17.

The frame determination unit 46 determines whether the data of the frame displayed by the display control unit 45 is the predetermined frame of either one of the above-described postures or not.

When it is determined by the frame determination unit 46 that the frame is not the predetermined frame, the processing is repeated by the identification unit 44 and the display control unit 45, until it is determined that the data of the frame identified by the identification unit 44 and displayed by the display control unit 45 is the predetermined frame.

Meanwhile, when it is determined by the frame determination unit 46 that the frame is the predetermined frame, the frame determination unit 46 further determines whether the predetermined frame is the frame corresponding to the "impact" posture or not.

When the predetermined frame is the frame corresponding to the "impact" posture, the frame number calculation unit 47 calculates the number of the frames corresponding to the "impact" posture.

The notification information acquisition unit 48 acquires the notification information corresponding to the above-described, respective predetermined frames from the notification information storage unit 62. For example, the notification information acquisition unit 48 acquires vibration information (information about vibration patterns) corresponding to the above-described, respective predetermined frames.

Figure 4:
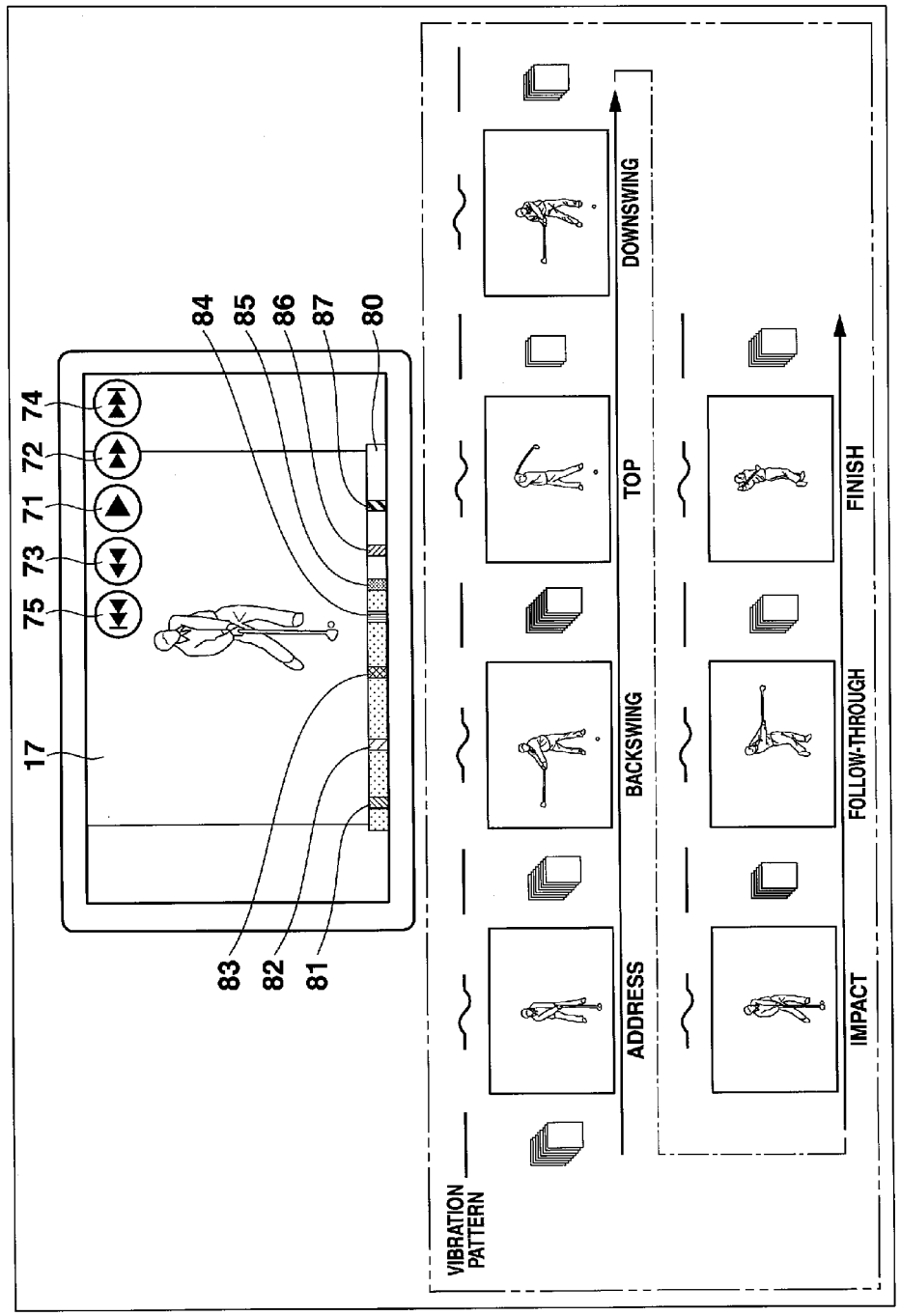
FIG. 4 is a view indicative of a vibration pattern as notification information for each of the identified frames.

With regard to the vibration patterns, the information about the vibration patterns is stored in the notification information storage unit 62, in which, for example, the common vibration pattern corresponds to the respective predetermined frames, as in FIG. 4.

Figure 5:
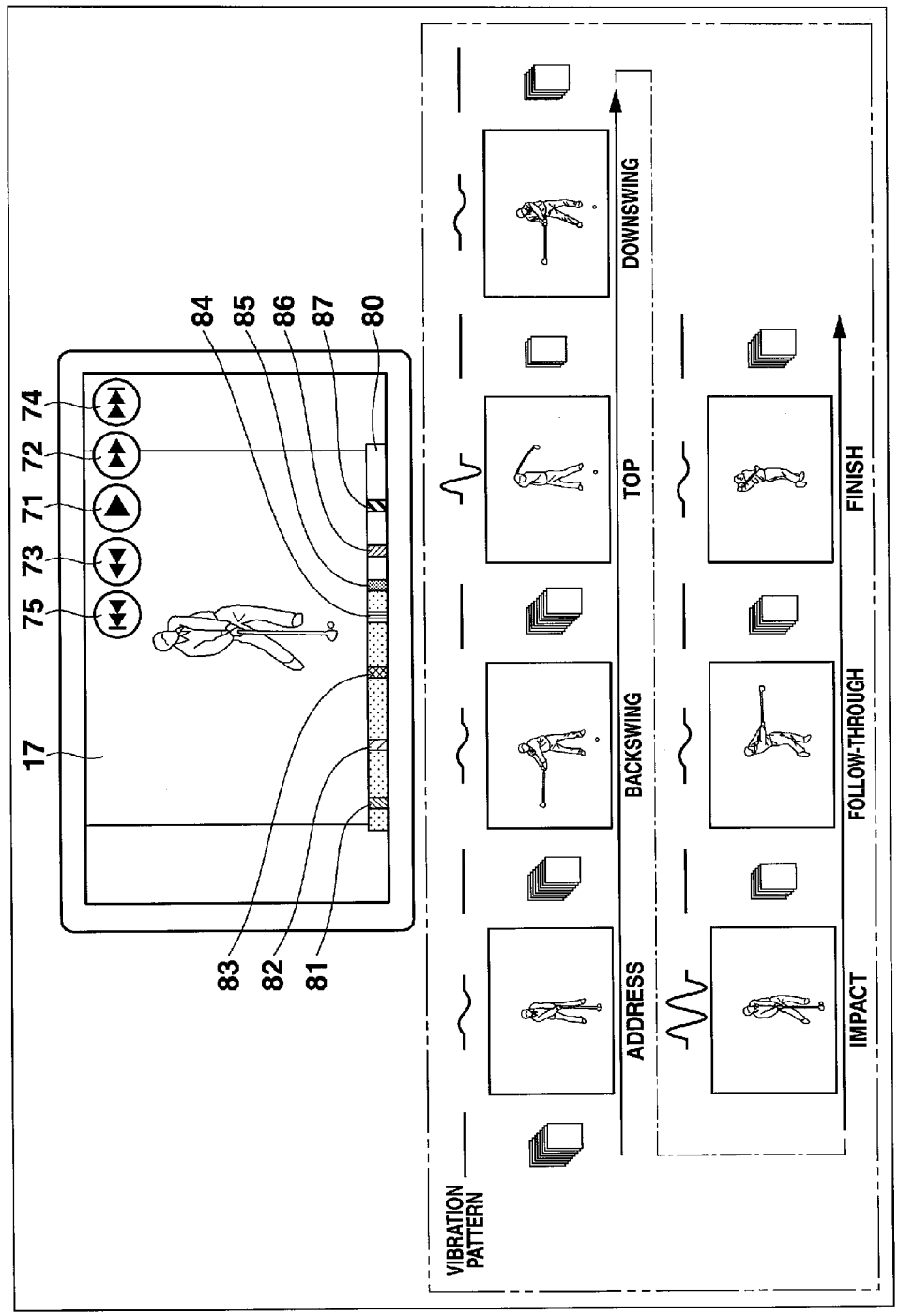
FIG. 5 is a view indicative of the vibration pattern as the notification information for each of the identified frames.

Alternatively, the information about the vibration patterns is stored in the notification information storage unit 62, in which, for example, the vibration pattern is decided for each of the predetermined frames, such as a special vibration pattern for the predetermined frame corresponding to the "top" posture, a special vibration pattern for the predetermined frame corresponding to the "impact" posture and the like, as in FIG. 5.

Figure 6:
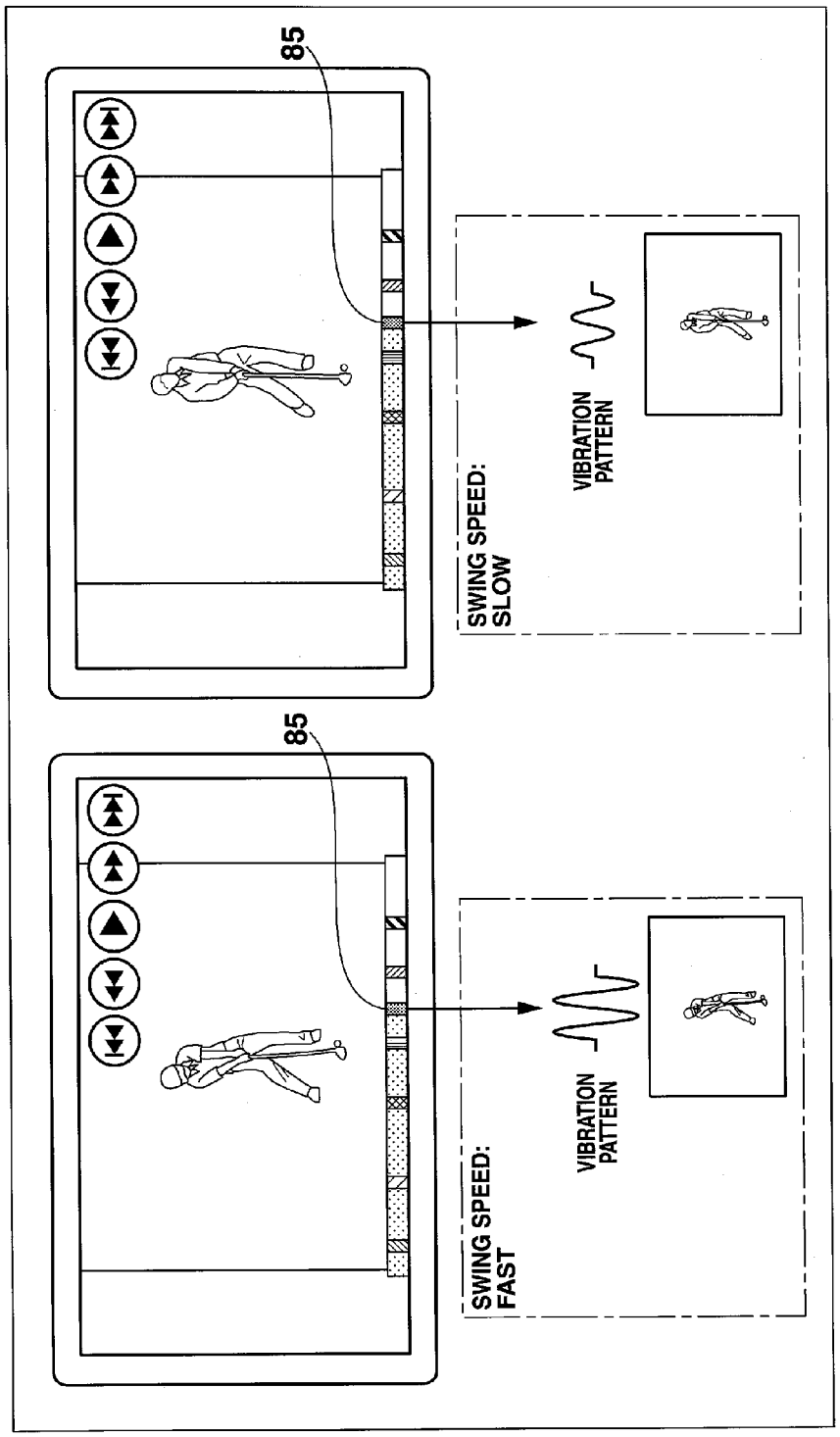
FIG. 6 is a view indicative of the vibration pattern as the notification information for the frame at the time of impact.

When it is determined by the frame determination unit 46 that the predetermined frame is the frame corresponding to the "impact" posture, the notification information acquisition unit 48 changes the vibration pattern according to the number of the frames calculated by the frame number calculation unit 47. It should be noted that, as described above, the smaller the number of the frames calculated by the frame number calculation unit 47, the faster the speed of the swing at the time of the "impact". Therefore, the notification information acquisition unit 48 increases vibration intensity of the vibration pattern for displaying the frames corresponding to the "impact" posture, as the number of the frames calculated by the frame number calculation unit 47 is smaller. Thus, as in FIG. 6, the vibration intensity of the vibration pattern increases as the swing speed at the time of the "impact" is faster.

Incidentally, the notification information is not limited to the vibration, and may be a sound and a sound volume, or a display mode. Namely, the sound and the sound volume, or the display mode may be decided for each of the predetermined frames and stored in the notification information storage unit 62. When the notification information is information about the sound and the sound volume, the sound is produced during a period that is equal to the period while the vibration is continued when the notification information is the vibration. Moreover, the sound is produced with the sound volume corresponding to the vibration intensity. In other words, the sound volume increases as the vibration intensity becomes higher. When the notification information is information about the display mode, the display mode is notified during a period that is equal to the period while the vibration is continued when the notification information is the vibration.

Incidentally, the type of the notification information may be changed by the user operating the touch panel 16.

Back to FIG. 2, the notification control unit 49 transmits the notification information (vibration patterns) acquired from the notification information acquisition unit 48 to the vibration device 20. When the notification information is about the sound or the sound volume, the notification control unit 49 transmits the notification information acquired from the notification information acquisition unit 48 (information about the sound and the sound volume) to a sound system (not illustrated) that is provided with a sound source unit (not illustrated), an audio circuit (not illustrated), and a speaker (not illustrated). When the notification information is about the display mode, the notification control unit 49 causes the display section 17 to display the notification information (information about the display mode) acquired from the notification information acquisition unit 48.

[Notification Control Processing]

Next, the notification control processing executed by the notification control apparatus 1 will be explained.

Figure 7:
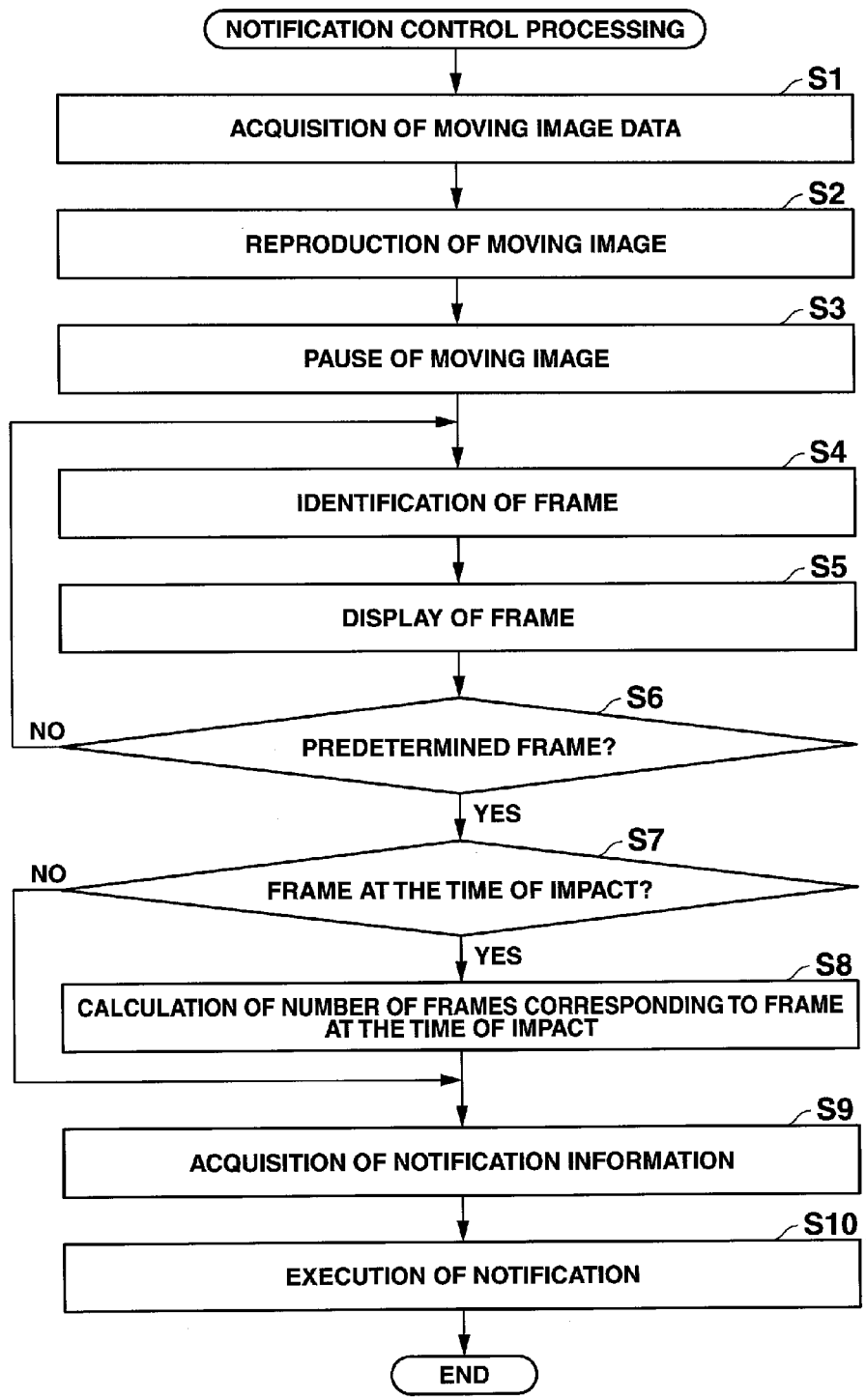
FIG. 7 is a flowchart indicative of the flow of the notification control processing executed by the notification control apparatus of FIG. 1 that has the functional configuration of FIG. 2.

FIG. 7 is a flowchart indicative of an example of the flow of the notification control processing executed by the notification control apparatus 1 of FIG. 1 that has the functional configuration of FIG. 2.

In FIG. 7, when the touch panel 16 of the notification control apparatus 1 is operated in order to start the acquisition of the moving image data, the processing of the following steps S1 to S10 is started.

In the step S1, the moving image acquisition unit 41 reads out the moving image data stored in the moving image storage unit 61. Namely, the moving image acquisition unit 41 decodes the moving image data stored in the moving image storage unit 61 sequentially in a frame unit, and stores the decoded data of a series of the frames in the RAM 13.

In the step S2, the reproduction unit 42 executes the reproduction of the moving image data acquired in the step S1.

In the step S3, the pause unit 43 executes the pause processing of the reproduction of the moving image data that is executed in the step S2.

In the step S4, the identification unit 44 identifies the frame in the moving image according to the skipping operation by the user while the reproduction of the moving image data is paused in the step S3. Incidentally, there are a plurality of the frames in the moving image, and the respective frames correspond to a series of golf swing movements of the subject. Therefore, the identification unit 44 identifies the frame corresponding to one of the series of the movements, according to the skipping operation by the user.

In the step S5, the display control unit 45 causes the display section 17 to display the data of the frame identified in the step S4. In other words, the display control unit 45 causes the display section 17 to display the data of the frame identified according to the skipping operation by the user. Thus, the data of the frame identified according to the skipping operation by the user, while the moving image is paused, is displayed on the display section 17.

In the step S6, the frame determination unit 46 determines whether the frame posture displayed in the step S5 is the predetermined frame corresponding to either one of the above-described seven types of postures or not.

When it is determined in the step S6 that the frame is not the predetermined frame corresponding to either one of the above-described seven types of postures, the processing is returned back to the step S4 by the frame determination unit 46. In other words, the processing from the step S4 to the step S6 is repeated until it is determined that the data of the frame identified in the step S4 and displayed in the step S5 is the predetermined frame corresponding to either one of the postures.

Meanwhile, when it is determined in the step S6 that the frame is the predetermined frame, the processing is proceeded to the step S7 by the frame determination unit 46.

In the step S7, the frame determination unit 46 determines whether the displayed frame is the predetermined frame corresponding to the "impact" posture or not, out of the predetermined frames corresponding to the "address", "backswing", "top", "impact", "follow-through", and "finish" postures.

In the step S7, when it is determined that the player's posture in the predetermined frame corresponds to the "impact" posture, for example, out of the predetermined frames corresponding to the above-described seven types of postures, the processing proceeds to the step S8.

In the step S8, the frame number calculation unit 47 calculates the number of the frames corresponding to the "impact" posture. The number of the frames corresponding to the "impact" posture is the number of the frames in the period decided for the "impact" posture.

Meanwhile, when it is determined that the predetermined frame does not correspond to the "impact" posture in the step S7, the processing proceeds to the step S9.

In the step S9, the notification information acquisition unit 48 acquires the notification information corresponding to the predetermined frame from the notification information storage unit 62. For example, the notification information acquisition unit 48 acquires the vibration information corresponding to the predetermined frame that relates to either one of the above-described seven types of postures.

In addition, when it is determined in the step S7 that the predetermined frame is the frame corresponding to the "impact" posture, the notification information acquisition unit 48 changes the vibration pattern corresponding to the "impact" posture, according to the number of the frames calculated in the step S8. It should be noted that, as described above, the speed of the swing at the time of the "impact" is faster, as the number of the frames calculated by the frame number calculation unit 47 is smaller. Therefore, in the step S10 that will be described later, the notification control unit 49 increases the intensity of the vibration pattern of the frame corresponding to the "impact" posture, as the number of the frames calculated in the step S8 is smaller.

In the step S10, the notification control unit 49 transmits the information about the vibration pattern, acquired in the step S9, to the vibration device 20. When the notification information is about the sound or the sound volume, the notification control unit 49 transmits the information about the sound and the sound volume, acquired in the step S9, to the sound system (not illustrated) that is provided with the sound source unit (not illustrated), the audio circuit (not illustrated), and the speaker (not illustrated). When the notification information is about the display mode, the notification control unit 49 causes the display section 17 to display the information about the display mode, acquired in the step S9.

The explanation of the embodiment of the present invention has been made thus far.

The notification control apparatus 1 for executing the above-described notification control processing is provided with the moving image acquisition unit 41, the identification unit 44, and the notification control unit 49.

The moving image acquisition unit 41 acquires the moving image of the series of the golf swing movements stored in the moving image storage unit 61.

The identification unit 44 identifies the frame out of the plurality of frames forming the moving image that is acquired from the moving image acquisition unit 41, according to the skipping operation.

The notification control unit 49 notifies that the predetermined frame is identified, when the frame identified by the identification unit 44 is the predetermined frame.

This facilitates the identification of the frame in the moving image according to the user's will.

There are a plurality of types of the predetermined frames, and the notification control unit 49 executes the notification corresponding to the types of the predetermined frames.

As the notification mode changes according to the types of the predetermined frames, the frame according to the user's will can be identified in the moving image with ease.

The predetermined frame is included in one or more frames of a predetermined period, and the notification control unit 49 controls the intensity of the notification according to the number of the frames of the predetermined period.

Therefore, when the predetermined frame is at the time of the "impact", for example, the intensity of the vibration or the sound volume as the notification can be controlled according to the swing speed.

Further, the notification control apparatus 1 is further provided with the reproduction unit 42, the display section 17, the pause unit 43, and the display control unit 45.

The reproduction unit 42 reproduces the moving image.

The display section 17 displays the plurality of frames constituting the moving image reproduced by the reproduction unit 42.

The pause unit 43 pauses the reproduction of the moving image by the reproduction unit 42.

The display control unit 45 causes the display section 17 to sequentially display the frames identified by the identification unit 44, while the reproduction of the moving image is paused by the pause unit 43.

The notification control unit 49 notifies that the predetermined frame is identified when one of the frames that are sequentially displayed by the display control unit 45 corresponds to the predetermined frame.

Therefore, the frame according to the user's will can be identified while pausing the moving image and checking the image displayed on the display section.

The skipping operation can also be made by the touch operation of the progress bar 80 in the display section 17.

This makes it possible to easily and intuitively identify the frame according to the user's will.

The notification control unit 49 notifies that the predetermined frame is identified by the sound, the display mode, or the vibration.

This increases the variations of the notification and thus enhances the enjoyment of identifying the frame according to the user's will.

It should be noted that the present invention is not limited to the above-described embodiment, and various modifications, improvements and the like may be included in the present invention as long as the purpose of the present invention can be accomplished.

According to the above-described embodiment, when the touch operation of the skip buttons 74 and 75 is made, the frame is skipped to the frame that is succeeding or preceding by the predetermined number, but this is not restrictive. Namely, the frame may be skipped to the predetermined frame that is closest to the reproduced position, not to the frame that is succeeding or preceding by the predetermined number.

Further, the flowchart of FIG. 7 according to the above-described embodiment is executed while the moving image is paused by the step S3, but this is not restrictive. Namely, the purpose of the present invention can be sufficiently accomplished when the processing in and after the step S4 is executed while the moving image is reproduced by the step S2, not while the moving image is paused by the step S3.

Furthermore, in the processing of the steps S7 to S10, the intensity of the notification at the time of the impact is controlled according to the number of the identified frames at the time of the impact, but this is not restrictive. Namely, the intensity of the notification may be controlled by calculating a motion vector in the moving image so as to calculate the swing speed at the time of the impact.

Further, the intensity of the notification is controlled at the time of the impact, but this is not restrictive. The intensity of the notification may be controlled at the time of the "address", the "backswing", the "top", the "follow-through", or the "finish".

Furthermore, according to the above-described embodiment, the notification is made only when the identified frame is the predetermined frame, but this is not restrictive. For example, as in FIG. 8, minute vibration may be caused at all times while the swing is made in the moving image, and the vibration may be stopped when the swing stops (until the start of the swing (address), at the time of the top, and after the end of the swing (finish)). This makes it possible to add a sense of presence as if the user is actually holding a golf club.

Further, according to the above-described embodiment, the seven types of postures such as the "address" posture and the like are defined as the identified postures, but this is not restrictive, and other states may be defined. Furthermore, the number of the types of identified postures may be six or less or eight or more.

Further, the above-described embodiment explains, as one example, the case of applying the present invention to the moving image data in which the golf swing is captured, but the present invention may be applied to various motions. For example, the present invention may be applied to the motions of the various sports including the swing of a baseball bat, the swing of a tennis racket, dance choreography or the like.

Furthermore, the above-described embodiment may be applied not only to the moving image of various kinds of sports, but also to detection of a specific chapter at the time of reproducing a DVD, so that the user can intuitively find out that, when the user executes the skipping operation, the frame belongs to the specific chapter, during the skipping operation.

Further, according to the above-described embodiment, the notification control apparatus 1, to which the present invention is applied, may be applied to the electronic equipment in general having the image processing function. Specifically, the present invention may be applied to, for example, a notebook personal computer, a printer, a television receiver, a video camera, a portable navigation apparatus, a mobile phone, a portable game player, and the like.

The series of the processing as described above can be executed by the hardware, or by software.

In other words, the functional configuration of FIG. 2 is just one example and is not particularly restrictive. Namely, it is only necessary that the notification control apparatus 1 is provided with the function of executing the above-described series of the processing as a whole, and the functional block to be used to realize this function is not particularly limited to the example of FIG. 2.

Furthermore, one functional block may be formed by a single piece of hardware, a single piece of software, or a combination thereof.

When the series of the processing is executed by the software, a program constituting the software is installed into the computer or the like from the network or the storage medium.

The computer that is installed in dedicated hardware may be used. Further, the computer capable of executing the various functions by installing the various programs therein, such as a general-purpose personal computer, may be used.

The storage medium containing such a program is formed not only by the removable medium 31 of FIG. 1 that is distributed separately from the apparatus body in order to provide the program to the user, but also by the storage medium that is provided to the user by being installed in the apparatus body in advance. The removable medium 31 is formed by, for example, a magnetic disk (including a floppy disk), an optical disk, a magneto-optical disk or the like. The optical disk is formed by, for example, CD-ROM (Compact Disk-Read Only Memory), a DVD (Digital Versatile Disk) or the like. The magneto-optical disk is formed by a MD (Mini-Disk) or the like. The storage medium that is provided to the user by being installed in the apparatus body in advance is formed by, for example, the ROM 12 of FIG. 1, in which the program is stored, the hard disk contained in the storage section 18 of FIG. 1 or the like.

Incidentally, in this specification, the steps describing the program stored in the storage medium include not only the time series processing that is executed in order, but also the non-time series processing that is executed in parallel or separately.

The embodiments of the present invention have been explained thus far, but the embodiments are only the examples and are not intended to limit the technical scope of the present invention. The present invention may be embodied in various other ways, and various changes including omission, replacement and the like may be made without departing from the spirit of the present invention. Such embodiments and modifications are included in the scope and the spirit of the invention described in this specification, in the invention described in the claims, and in the scope of equivalents.

What is claimed is:
1. A notification control apparatus comprising:
a processor which is configured to:
acquire a moving image constituted by a plurality of frames, wherein the plurality of frames constituting the moving image include a plurality of groups of frames corresponding, respectively, to partial motions of a sequence of motion of a subject of the moving image, and at least one frame which is different from the frames constituting the plurality of groups, wherein the plurality of groups of frames may each be constituted by a different number of frames;
identify a frame from among the plurality of frames constituting the moving image; and
in a case in which the identified frame is one of the frames constituting one of the plurality of groups, issue noti- fication information indicating that the identified frame is one of the frames constituting one of the plurality of groups;

wherein the processor issues the notification information such that an intensity of the notification information differs depending on a number of the frames constituting the group which includes the identified frame, whereby the intensity of the notification information when the group which includes the identified frame is constituted by a first number of frames is different from the intensity of the notification information when the group which includes the identified frame is constituted by a second number of frames that is different from the first number of frames.

2. The notification control apparatus according to claim 1, wherein:
the plurality of groups of frames correspond, respectively, to a plurality of types corresponding, respectively, to the partial motions of the sequence of motion of the subject, and
the processor issues notification information corresponding to the type of the group of frames which includes the identified frame.

3. The notification control apparatus according to claim 1, wherein:
the plurality of groups of frames are, respectively, frames of predetermined periods corresponding, respectively, to the partial motions of the sequence of motion, and
the processor issues the notification information such that the intensity of the notification information depends on the number of frames in the predetermined period corresponding to the group which includes the identified frame.

4. The notification control apparatus according to claim 1, wherein the processor is further configured to:
execute reproduction of the moving image;
pause the reproduction of the moving image; and
cause a display to sequentially display the frames in accordance with a skipping operation, while the reproduction of the moving image is paused,
wherein:
the processor identifies at least one of the frames subjected to the skipping operation, and determines whether said identified at least one of the frames subjected to the skipping operation is one of the frames constituting one of the plurality of groups, and
the processor issues the notification information indicating that said identified at least one of the frames subjected to the skipping operation is one of the frames constituting one of the plurality of groups, when it is determined that said identified at least one of the frames is one of the frames constituting one of the plurality of groups.

5. The notification control apparatus according to claim 4, wherein the skipping operation is a contact operation on a predetermined area in the display.

6. The notification control apparatus according to claim 1, wherein the processor issues the notification information by a sound, a display mode, or a vibration.

7. The notification control apparatus according to claim 1, wherein the processor issues the notification information in a notification pattern corresponding to the number of the frames constituting the group which includes the identified frame.

8. The notification control apparatus according to claim 1, wherein the first number is less than the second number, and wherein the processor issues the notification information such that the intensity of the notification information when the group which includes the identified frame is constituted by the first number of frames is higher than the intensity of the notification information when the group which includes the identified frame is constituted by the second number of frames.

9. The notification control apparatus according to claim 1, wherein the first number is greater than the second number, and wherein the processor issues the notification information such that the intensity of the notification information when the group which includes the identified frame is constituted by the first number of frames is lower than the intensity of the notification information when the group which includes the identified frame is constituted by the second number of frames.

10. The notification control apparatus according to claim 1, wherein the partial motion is a posture of the sequence of motion of the subject of the moving image.

11. The notification control apparatus according to claim 1, wherein the processor issues the notification information by vibration.

12. A notification control method executed by a notification control apparatus, the method comprising:
acquiring a moving image constituted by a plurality of frames, wherein the plurality of frames constituting the moving image include a plurality of groups of frames corresponding, respectively, to partial motions of a sequence of motion of a subject of the moving image, and at least one frame which is different from the frames constituting the plurality of groups, wherein the plurality of groups of frames may each be constituted by a different number of frames;
identifying a frame from among the plurality of frames constituting the moving image; and
in a case in which the identified frame is one of the frames constituting one of the plurality of groups, issuing notification information indicating that the identified frame is one of the frames constituting one of the plurality of groups;
wherein the notification information is issued such that an intensity of the notification information differs depending on a number of the frames constituting the group which includes the identified frame, whereby the intensity of the notification information when the group which includes the identified frame is constituted by a first number of frames is different from the intensity of the notification information when the group which includes the identified frame is constituted by a second number of frames that is different from the first number of frames.

13. A non-transitory storage medium having stored thereon a computer-readable program that is executable by a computer to cause the computer to perform functions comprising:
acquiring a moving image constituted by a plurality of frames, wherein the plurality of frames constituting the moving image include a plurality of groups of frames corresponding, respectively, to partial motions of a sequence of motion of a subject of the moving image, and at least one frame which is different from the frames constituting the plurality of groups, wherein the plurality of groups of frames may each be constituted by a different number of frames;
identifying a frame from among the plurality of frames constituting the moving image; and
in a case in which the identified frame is one of the frames constituting one of the plurality of groups, issuing notification information indicating that the identified frame is one of the frames constituting one of the plurality of groups;

wherein the notification information is issued such that an intensity of the notification information differs depending on a number of the frames constituting the group which includes the identified frame, whereby the intensity of the notification information when the group which includes the identified frame is constituted by a first number of frames is different from the intensity of the notification information when the group which includes the identified frame is constituted by a second number of frames that is different from the first number of frames.

\* \* \* \* \*